Nov. 7, 1950            L. M. KEEFE            2,529,083

APPARATUS FOR MAKING RECORDS

Filed July 9, 1946                              2 Sheets-Sheet 1

FIG.I.

INVENTOR
LINCOLN M. KEEFE

BY
J. A. Grier
Attorney.

Nov. 7, 1950     L. M. KEEFE     2,529,083
APPARATUS FOR MAKING RECORDS
Filed July 9, 1946     2 Sheets—Sheet 2
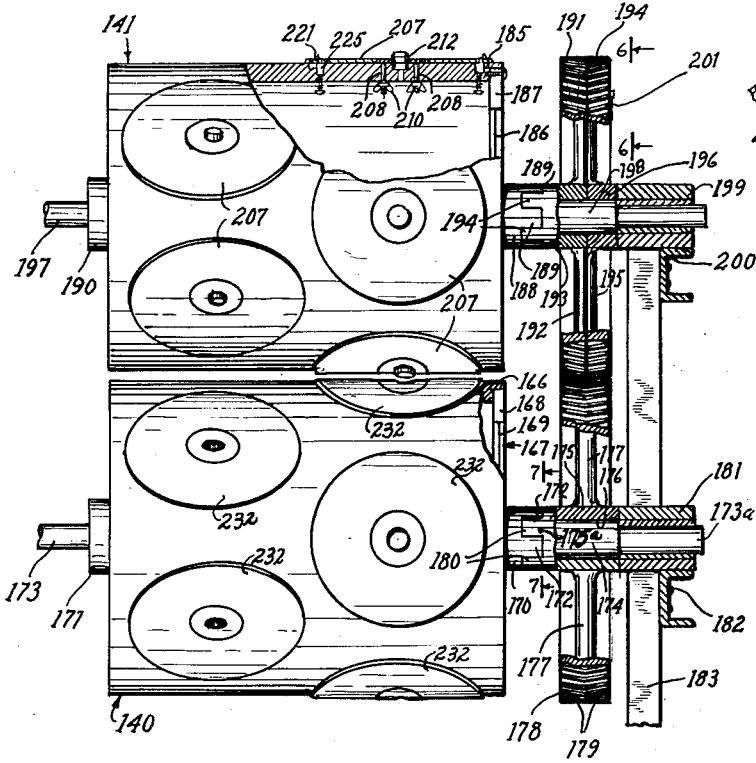
FIG.2.
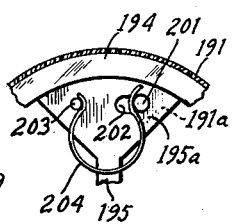
FIG.3.
FIG.4.
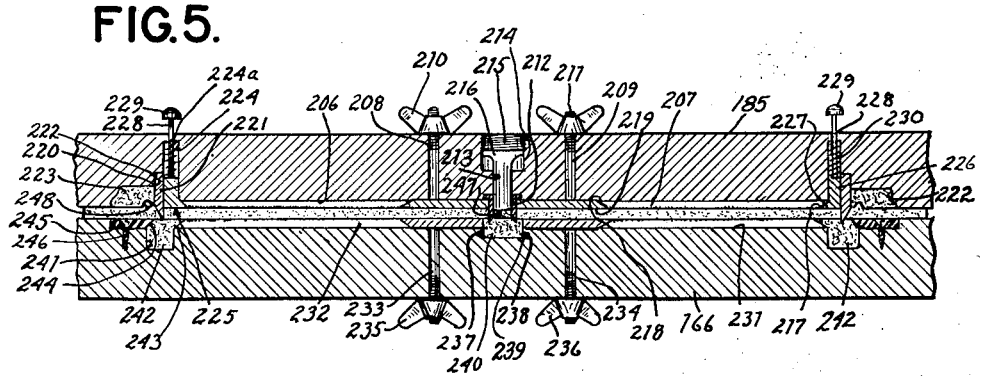
FIG.5.
FIG.6.
INVENTOR
LINCOLN M. KEEFE
BY
*J. G. Green*
Attorney.

Patented Nov. 7, 1950

2,529,083

UNITED STATES PATENT OFFICE 2,529,083

APPARATUS FOR MAKING RECORDS

Lincoln M. Keefe, Brooklyn, N. Y.

Application July 9, 1946, Serial No. 682,260

3 Claims. (Cl. 18—21)

This invention relates to improvements in apparatus for making records and has for an object the provision of a web carrying formable surfaces which is continuously passed between cooperating rollers carrying matrixes of sound recordings and annular cutting means, associated with each pair of matrixes, cuts the records in the form of discs as they are formed.

Another object of the invention is the provision in apparatus for forming or molding records, of a web having both faces thereof carrying formative material, said web being passed through rollers for impressing sound tracks thereon to form records and at the same time cutting said records out from the web in the form of discs, and the provision of means to recover the formative material from the remainder of said web.

A further object of the invention is the provision in apparatus for forming or molding records of, a pair of cooperative wheels geared together without backlash, and carrying, in the peripheries of their outer surfaces, record dies or "stampers" having spiral sound track forming portions thereon, there being an equal number of dies on each of said surfaces, and so related that each record formed has a sound track on one side formed from a die on one of said wheels, and a sound track on the other side made from a die on the other of the wheels, said sound tracks being substantially concentric.

Another object of the invention is the provision of rotative apparatus for forming records, and including cooperating rollers carrying means for molding disc records from a web carrying formative material, and means partly on one of said rollers and partly on the other of said rollers for cutting said discs out as the records are formed.

Other objects and advantages of the invention will become apparent to those skilled in the art upon a study of the following specification and the accompanying drawings.

Heretofore the most widely used method of producing phonograph records was to produce matrixes or "stampers" of the subjects or material for impressing sound tracks in the records in a record press. Two matrixes were mounted in the press—one facing upward to form or mold the lower surface of the record, and the other facing downwardly to form or mold the upper surface of the record. The press is opened and a ball, or biscuit, of plastic is placed in the press between the matrixes, heat is applied to heat the matrixes and to soften the plastic so that when pressure is applied to move the matrixes toward one another, the record is formed. Then the matrixes and the record must be cooled so that the press may be opened and the record removed.

Obviously the handling of the records one by one, and the time element for the heating and the subsequent cooling steps, makes it necessary that the records be sold at prices commensurate with the labor cost of this time, and with the time in which the expensive press is tied up in the making of each single record.

Contrasted with this I propose to make records in pluralities and rapidly. A web is coated on both sides with a formative material, and as this web leaves the coating apparatus, it is delivered directly to the record forming molding and cutting apparatus which includes a pair of cooperative rollers geared together without backlash. In the peripheral surfaces of these rollers are cooperative matrixes, or "stampers," which form the sound tracks in the records, the absence of backlash insuring the concentricity and the absence of "wow-wows." Cooperative cutting means carried partly on one of the rollers and partly on the other of the rollers, cuts the discs out from the web, and the remainder of the web is processed to recover therefrom the formative material thereon.

The cut out discs may pass into a packing room in a substantially continuous flow and thereby records are produced at a small fraction of the costs of records made by any other method.

Referring to the drawings which are merely given by way of example to illustrate the invention:

Figure 2 is an elevation, partly in section, showing two rollers geared together and carrying record forming means, and means for cutting discs from the web in accordance with the invention;

Figure 3 is a fragmentary view taken along the line 3—3 of Figure 2;

Figure 4 is a view showing a form of coupling employed for coupling the rollers in driven relation with their drive shafts;

Figure 5 is an enlarged sectional elevation of portions of the rims of the two rollers carrying record forming means, means for cutting the record discs from the web, and means for ejecting the discs from the cutting means; and Figure 6 is a fragmentary sectional view showing the action of the ejecting means.

Figure 1:
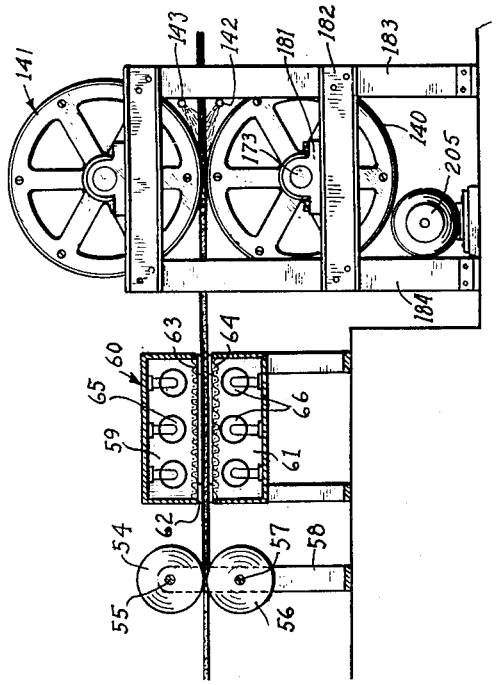
Figure 1 is a diagrammatic representation of a portion of a system for forming records from a web.

Referring to Figure 1, a web after it has had its upper and lower surfaces heated or slightly softened, passes between drum rollers 141 and 142 where the records are formed, cut out from the web and stripped from the cutting out means in a manner to be presently described in connection with Figures 2 to 6 inclusive. As the web and the records leave the rollers 140 and 141, they are sprayed by jets 142 and 143 of cold water or any other suitable coolant.

Referring now to Figures 2 to 6 inclusive, which show details of the record forming apparatus, the drum wheel 140 includes a cylindrical portion 166 which has mounted on the outer surface thereof a plurality of matrixes or "stampers" which will be presently described. This cylindrical portion is counterbored or stepped on each end to accommodate wheel like members, one of which is shown at 167 and includes a rim 168 the diameter of, and fitting into, the counterbore and secured to the cylindrical portion. It also includes spokes 169 and a hub 170 having splines 172 formed therein. On the other end the wheel like member (not shown) has a hub 171 formed thereon, and this hub is preferably plain.

A shaft 173 forms a sliding fit with aligned holes in the hubs 171 and 170 and has a portion 174 of larger diameter within the bore 176 of the hub 175. This hub has spokes 177 formed integral therewith. Preferably formed integral with the outer ends of these spokes is a rim 178 having herringbone teeth 179 formed in the outer surface thereof, and constituting a herringbone gear hereinafter termed the herringbone gear 179. The hub 175 of this gear has an extended portion 175a which has splines 180 formed therein, and these splines cooperate with the splines 172.

The shaft portion 173a, beyond the portion 174, may be of the same diameter as the main portion of the shaft, and is journaled in a bearing 181 mounted on a structural bridge member 182. The member 182 is secured to two upright spaced structural members 183 and 184. The left end of the shaft 173, as seen in Figure 2, is likewise journaled in a bearing like the bearing 181 supported on a bridge member like the bridge member 182 secured to uprights like the uprights 183 and 184. The bearing and supports on the left end are removed when it is desired to remove one drum wheel 140 and substitute another. The splines serve to key the drum wheel to the hub of the herringbone gear 179, and said wheel may be slid off to the left or slid on to the right.

The drum wheel 141 includes a cylindrical portion 185 which also has "stampers" and concentric cutting blades which will be presently described. This cylindrical portion is also counterbored or stepped in each end thereof to accommodate the rims of wheel-like members, one of which is shown at 186 and which includes a rim 187 fitting the counterbore on the right end of the cylindrical portion 185. The member 186 also includes a hub 188 having splines 189.

A similar wheel-like member fits the counterbore in the left end of the cylindrical portion 185 and has a plain hub 190 similar to the hub 171.

A gear 191 has teeth which are angular and it constitutes one half of a herringbone gear. It has a hub 193 with splines 194 which engage the splines 189 on the drum wheel 141. A gear wheel 194, which constitutes the other half of a herringbone gear, has a hub 196 and spokes 195.

Although the use of herringbone gears minimizes backlash, the arrangement shown in Figure 3 is devised to eliminate backlash. The gear 191 has secured to its spoke web 191a a stud 201 extending axially through an arcuate slot 202 formed in the spoke web 195a.

The web 195a also carries an axial stud 203, spaced apart from the stud 201. A curved spring 204 having one end engaging the stud 201 and the other end engaging the stud 203, urges them oppositely, and in turn the gear wheels 191 and 194 are urged oppositely, thereby eliminating backlash between the herringbone gear 179 and the composite or two part herringbone gear 191—194.

The drum wheels may be driven (via said herringbone gears) by suitable reduction gearing (not shown) powered by an electric motor 205.

A shaft 197 has a portion 198 of increased diameter within the hubs 193 and 196, and to the right of the portion 198, the shaft portion 197a is preferably the same diameter as the main portion 197, and is journaled in a bearing 199 mounted on a horizontal structural member 200 which is also secured to the uprights 183 and 184. On the left end, the shaft is journaled in a bearing similar to the bearing 199, mounted on a horizontal member like 200 secured to uprights like 183 and 184. All of the elements described on the left end of the shaft are removable when it is desired to remove one drum wheel and substitute another as was above described in connection with the drum wheel 140. After the substitution the bearings may be replaced on the left ends of the shafts and the supports are secured in place, and the device is ready to produce records from the stampers on the substituted drum wheels.

Now as to the details of the mounting of the stampers and allied devices on the drum wheels, reference is made to Figure 5 which is an enlarged cross-section.

The annular drum 185 carries a plurality of stampers which are all mounted in the same manner as the one shown in enlarged detail. A circular depression 206 is formed in the peripheral surface of the wall of the drum 185, and the matrix or stamper 207 is of such shape that it fits in and uses the depression 206 as a socket. Bolts 208 and 209 extend through holes formed in the wall of the drum 185, and are engaged respectively by wing nuts 210 and 211.

Centrally located in the depression or socket 206, and extending through the stamper 207 is a tubular knife 212. A hole 213 substantially the size of the interior of the tubular knife 212, has an enlarged portion 214 containing threads which are engaged by corresponding threads formed on a plug member 215 which serves to retain a soft rubber, or the like, rod 216, the purpose of which will be presently described.

The surface of the stamper between a point 217 near the outer edge and a point 218 nearer to the middle thereof, may contain the means for forming the reproducible portion of the record. The surface 219 between the point 218 and the tubular knife 212 may carry the title and other information in intaglio (for example) to be impressed in the records as they are formed.

Concentric with the socket or depression 206 is a groove 220 in which is mounted an annular knife 221. Outside the circular knife 221, the wall 195 has an annular depression 222 formed therein. The cross section of this depression may best be seen in Figure 6. Mounted in this depression is a rubber or other deformable ring 223, the maximum deformation of which may be seen in Figure 5.

Disposed in the wall 195 within and adjacent to the inner walls of the knife 221 are a plurality of spaced holes 224 each of which has a portion 224a of smaller diameter. Between each hole and its portion of smaller diameter is formed a shoulder. The holes 224 are preferably rectangular, and the portions 224a are preferably round. The holes 224 may be so close together that their adjacent sides coincide, in which event they form a continuous annular groove.

Positioned in each hole 224 is a stripper 225, and in cases where a continuous annular groove is substituted for the holes 224, the strippers would contact one another and extend continuously around this groove, just inside the circular knife 221, with fixed studs interspersed for anchoring the outer periphery of the stamper to the wall at a plurality of points.

Each stripper 225 includes a rectangular body 226, an overhanging bevel 227, a threaded shank 228 which extends through the hole 224a, and a nut or the like 229 which may be set to limit the movement of the stripper. A spring 230 embraces the shank 228 and has one end contacting the end of the rectangular body and the other end contacting the shoulder at the bottom of the hole (or groove) 224 for urging or stripping discs, cut by the knife 221, outwardly. The several groups of strippers 225 might each be made in the form of arcuate sectors, but so far as we know at this time, the plurality of individual strippers is preferable.

The cylindrical wall 166 of the drive wheel 140 has a depression 231 formed therein (like the depression 206 in the wall 195 previously described) and positioned in or located by the depression is a stamper 232, which has bolts 233 and 234 extending through suitable holes in the wall 166. Wing nuts 235 and 236 respectively engage these bolts and secure the stamper thereon.

From the center of the depression 231 into the wall 166 is formed a hole 237, the bottom 238 of which is undercut to accommodate a retaining ring 239. Positioned in the hole 237 is a plug of lignum vitae or the like 240, which is adapted to cooperate with the tubular knife 212.

An annular groove 241 is formed in the wall 166 and its inner diameter clears the outer edges of the stamper 232. Positioned in the groove 241 is an annular ring 242 of lignum vitae, or the like, which has a beveled overhanging portion 243 and a cut bevel 244. The ring 242 is retained therein by means of a metallic ring 245 set into the surface of the wall 166 and overlapping the cut bevel 244. The ring 245 is secured to the wall 166 by means of screws 246.

We show a plurality of stampers on the drum wheel 141 and a plurality of mate stampers on the drum wheel 140, but since the other stampers on the drum wheel 141 are identical (except for subject matter in some instances) with the stamper 207 above described as mounted on the wall 195 of the drum wheel 141, further descriptions of them would be repetitive. Likewise descriptions of the other mate stampers identical with the description of the stamper 232 carried on the wall 166 of the drum wheel 140, are not believed necessary.

The web, as has hereinbefore been described, has its surfaces softened as it passes through the conditioning oven 60. After the web leaves the oven 60 is passes between the drum wheels 140 and 141, which are moving in unison, due to the fact that the herringbone gear 179 and the herringbone gear 191, 194 are of the same pitch diameters. The web is engaged between the stampers 207 and 232 along a line contact substantially parallel to the axes of the drum wheels 140 and 141, and this line contact is constantly advancing (to the left as seen in Figure 1) until, as the opposite edges of the stampers engage the web, the formation of the record is effected. At the same time the leading edge of the knife 221 has pierced the web (along an arcuate line) and has slightly entered the surface of the lignum 242. By the time the formation of the complete double face of the record is effected, the knife 221 has entirely cut it out from the web of record material. Prior to the completion of the cutting by the knife 221, the tubular knife 212 pierces the web and its circular edge enters the lignum 240, thereby forming the center hole in the record. The little disc, or washer, 247 which is removed by this operation, causes the compression of the rubber plug 216, so that a portion of the latter flows into the space 214, and when the tubular knife 212 and the lignum 240 are separated, as the formation of the record is approaching completion, the urge of the rubber plug causes the disc or washer 247 to be ejected from the tubular knife 212.

As the record is being formed the intaglio matter in the area between the point (circle) 218, and the exterior of the tubular knife 212, automatically impresses within a corresponding area on the record, the title, number, and other identifications as may be necessary.

As the knife 221 is cutting the web, it is held or bound by the progressive compression of the rubber ring 223. A distortion bead 248 formed in the web about the beveled surface of the knife 221 is within the confines of the ring 223. Also as the knife 221 is progressively cutting, each stripper 225 adjacent to the portion of the knife actually cutting is raised against the urge of its spring 230. It will be understood that, as the newly formed record is cut out from the web, it enters the interior of the ring knife 221, and the function of the strippers is, under the urge of the stripper springs 230, to eject the record from the knife 221.

I have found that by forming records as described above, the resultant records are of the highest quality, and it is believed that due to the enormous pressures exerted along the advancing "line of contact" the sound tracks produced therein are superior to those produced by devices of the prior art. Another great advantage in our new and improved apparatus is that we can produce records many times more rapidly, thereby substantially reducing the overall cost of the records.

Although the arrangements herein shown and described, were merely given by way of example to illustrate methods of practicing the invention, it is obvious that many changes may be made in the said arrangements without departing from the spirit of the invention as defined in the following claims.

What is claimed is:

1. In a device for producing records wherein two rotating drums driven in definite time relation to one another, carry matrixes matching each other in position relation, circular cutting means on one of said drums parallel to the outer periphery of the matrix thereon, stripper means set into the surface of said last-mentioned drum between and concentric with both the matrix thereon and said circular cutting means, and a ring of lignum vitae material set into the surface of the other of said drums parallel to the periphery of the matrix thereon and adapted to be engaged by the cutting edges of said cutting means as said drums are rotated, whereby an impressionable web, passed between said drums, receives impressions on opposite faces thereof from said matrixes and at the same time the portion receiving said impressions is cut out from the web to form a disc, said stripper means being adapted to force said disc from the interior surface of said circular cutting means.

2. In a device for producing records wherein rotating drums driven in definite time relation to one another carry matrixes matching each other in position relation, means to pass a formable web between said drums, circular cutting means on one of said drums parallel to the outer periphery of the matrix thereon, a small tubular knife carried on said last mentioned drum concentric with the matrix thereon, a ring of lignum-vitae set into the surface of the other of said drums parallel to the periphery of the matrix thereon and adapted to be engaged by the cutting edges of said cutting means as said drums are rotated, a small disc of lignum-vitae or the like set into the surface of said other drum concentric with the matrix and adapted to be engaged by said tubular knife as the latter forms center holes in the records, stripper means set into the surface of said first drum within said circular cutting means for stripping or ejecting cut out discs from the interior of said cutting means, and other stripper means concentric with said tubular knife adapted to eject from the latter plugs cut out from said web as said center holes are formed in the records.

3. In a device for producing phonograph records from a web, having formative material on the faces thereof, a frame, a pair of spaced shafts journaled in said frame, gear means positioned on one of said shafts and having a splined hub, a second gear means on the other of said shafts and also having a splined hub, means connected to at least one of said gear means for continuously eliminating backlash, a drum carrying matrixes, said drum being positioned on said first shaft and having a splined hub engaging the splined hub on said first gear means, a second drum carrying matrixes positioned on said second shaft and having a splined hub engaging the splined hub on said second gear means, heating means adapted to soften the surfaces of said formative material before said web reaches said matrixes, and cutting means concentric with and movable with the matrixes on at least one of said drums adapted to cut from said web material impressioned areas in the form of discs.

LINCOLN M. KEEFE.

REFERENCES CITED

The following references are of record in the file of this patent:

UNITED STATES PATENTS

| Number | Name | Date |
|---|---|---|
| Re. 16,384 | McCrohan et al. | July 13, 1926 |
| 87,983 | Stafford | Mar. 16, 1869 |
| 378,405 | Snyder et al. | Feb. 21, 1888 |
| 415,044 | Joslin | Nov. 12, 1889 |
| 468,613 | Frist | Feb. 9, 1892 |
| 770,648 | Oeser | Sept. 20, 1904 |
| 806,625 | Beecher | Dec. 5, 1905 |
| 837,633 | McAnulty | Dec. 4, 1906 |
| 892,085 | Rese | June 30, 1908 |
| 1,467,594 | Weiss | Sept. 11, 1923 |
| 1,533,124 | Lindsay | Apr. 14, 1925 |
| 1,539,149 | Thornburg | May 26, 1925 |
| 1,954,635 | Leonard Jr. | Apr. 10, 1934 |
| 1,970,396 | Scherer | Aug. 14, 1934 |
| 1,996,057 | Buckle | Apr. 2, 1935 |
| 2,281,877 | Green | May 5, 1942 |
| 2,319,040 | Conklin | May 11, 1943 |
| 2,371,074 | Spencer | Mar. 6, 1945 |
| 2,391,814 | Woodall | Dec. 25, 1945 |